United States Patent
Eskicioglu et al.

(10) Patent No.: US 9,603,077 B2
(45) Date of Patent: *Mar. 21, 2017

(54) METHOD FOR ASSOCIATING A PREMIER FEMTOCELL WITH USER EQUIPMENT

(71) Applicant: Alcatel Lucent, Paris (FR)

(72) Inventors: Suat Eskicioglu, Ottawa (CA); Cristian Demetrescu, Maidenhead (GB)

(73) Assignee: Alcatel Lucent, Boulogne-Billancourt (FR)

(*) Notice: Subject to any disclaimer, the term of this patent is extended or adjusted under 35 U.S.C. 154(b) by 35 days.

This patent is subject to a terminal disclaimer.

(21) Appl. No.: 14/476,296

(22) Filed: Sep. 3, 2014

(65) Prior Publication Data

US 2015/0045045 A1 Feb. 12, 2015

Related U.S. Application Data

(63) Continuation of application No. 12/265,215, filed on Nov. 5, 2008, now Pat. No. 8,862,137.

(51) Int. Cl.
| | | |
|---|---|---|
| *H04W 72/04* | (2009.01) | |
| *H04W 36/32* | (2009.01) | |
| *H04W 48/20* | (2009.01) | |
| *H04W 8/08* | (2009.01) | |
| *H04W 76/02* | (2009.01) | |
| *H04W 84/04* | (2009.01) | |
| *H04W 36/00* | (2009.01) | |
| *H04W 36/14* | (2009.01) | |

(52) U.S. Cl.
CPC .............. *H04W 36/32* (2013.01); *H04W 8/08* (2013.01); *H04W 48/20* (2013.01); *H04W 76/021* (2013.01); *H04W 36/0094* (2013.01); *H04W 36/14* (2013.01); *H04W 76/02* (2013.01); *H04W 84/045* (2013.01)

(58) Field of Classification Search
CPC .............................. H04W 40/00; H04W 48/20
See application file for complete search history.

(56) References Cited

U.S. PATENT DOCUMENTS

| | | | | |
|---|---|---|---|---|
| 7,941,144 B2* | 5/2011 | Nylander | ............... | H04W 12/08 455/435.1 |
| 8,559,952 B2* | 10/2013 | Frenger | ............... | H04J 11/0093 370/319 |
| 2009/0325583 A1* | 12/2009 | Burgess | ............... | H04W 48/16 455/444 |
| 2010/0075698 A1* | 3/2010 | Rune | ..................... | H04W 68/08 455/458 |

* cited by examiner

*Primary Examiner* — Michael T Vu
(74) *Attorney, Agent, or Firm* — Davidson Sheehan LLP

(57) ABSTRACT

The present invention provides a method for implementation in user equipment that is configured to communicate with a wireless communication system that includes at least one macro-cell and a plurality of femtocells. The method includes providing a call connection request from the user equipment to one of the plurality of femtocells and receiving information indicating a location of the femtocell and information indicating the femto cell is a premier femtocell associated with the user equipment. The call connection request is received at the user equipment from the premier femtocell in response to providing the call connection request. The method further includes storing the information indicating the location of the premier femtocell in the user equipment.

10 Claims, 4 Drawing Sheets

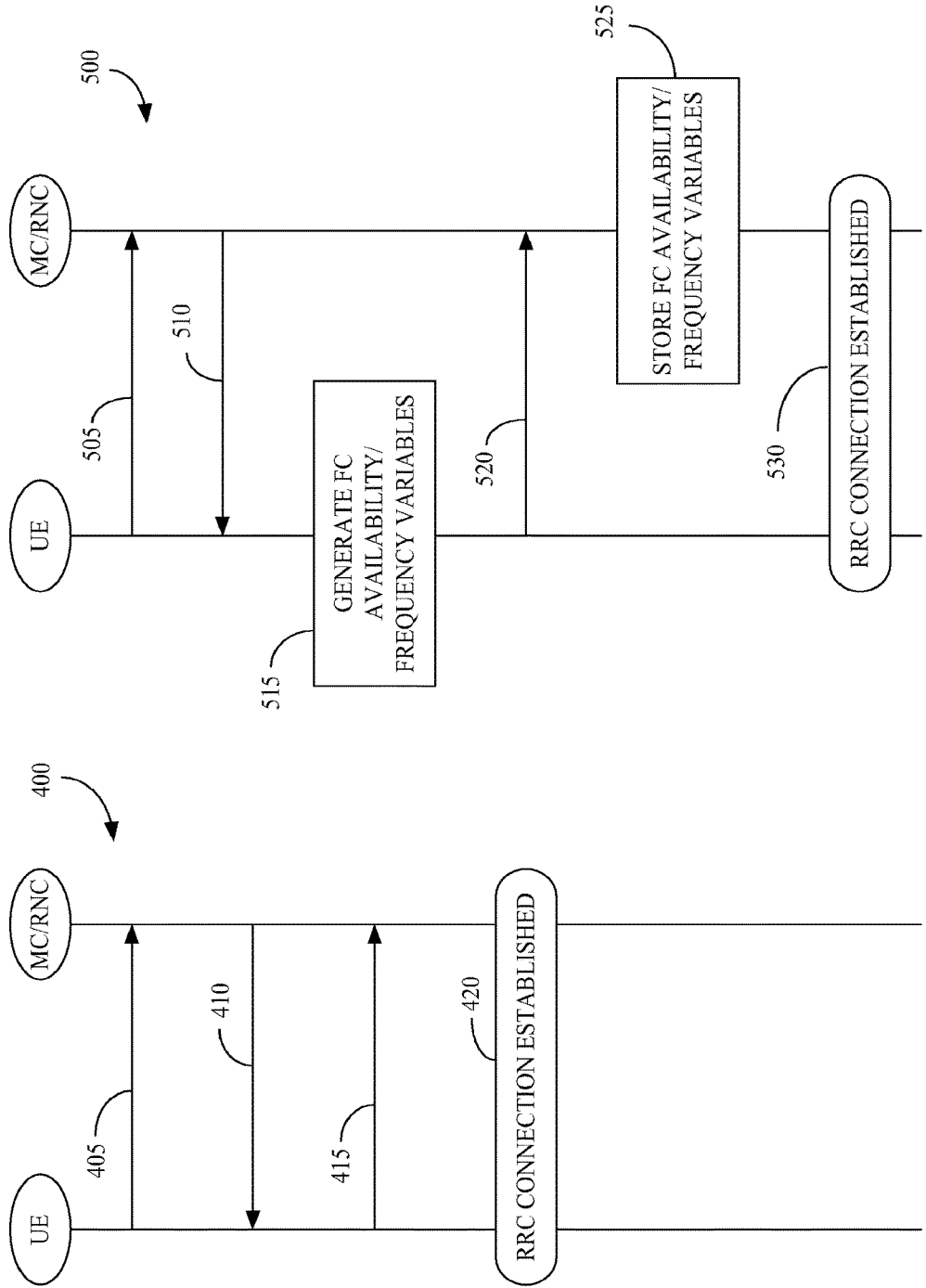

METHOD FOR ASSOCIATING A PREMIER FEMTOCELL WITH USER EQUIPMENT

CROSS REFERENCE TO RELATED APPLICATIONS

The present application is a continuation of U.S. patent application Ser. No. 12/265,215, filed Nov. 5, 2008, entitled "METHOD FOR ASSOCIATING A PREMIER FEMTOCELL WITH USER EQUIPMENT" inventors SUAT ESKICIOGLU and CRISTIAN DEMETRESCU, the entirety of which is incorporated by reference herein.

This application is related to U.S. patent application Ser. No. 12/265,089 filed on Nov. 5, 2008, entitled "LOCATION-BASED HANDOVERS FROM A MACROCELL TO A FEMTOCELL USING EVENT-TRIGGERED MEASUREMENT REPORT" inventors CRISTIAN DEMETRESCU and SUAT ESKICIOGLU.

This application is related to U.S. patent application Ser. No. 12/265,136 filed on Nov. 5, 2008, entitled "LOCATION-BASED HANDOVERS FROM A MACROCELL TO A FEMTOCELL USING PERIODIC MEASUREMENT REPORTING" inventors CRISTIAN DEMETRESCU and SUAT ESKICIOGLU.

This application is related to U.S. patent application Ser. No. 12/265,173 filed on Nov. 5, 2008, entitled "METHOD FOR ASSOCIATING A CLUSTER OF PREMIER FEMTOCELLS WITH USER EQUIPMENT" inventors CRISTIAN DEMETRESCU and SUAT ESKICIOGLU.

BACKGROUND OF THE INVENTION

1. Field of the Invention

This invention relates generally to communication systems, and, more particularly, to wireless communication systems.

2. Description of the Related Art

Conventional wireless communication systems use a network of base stations to provide wireless connectivity to one or more mobile units. In some cases, the mobile units may initiate wireless communication with one or more base stations in the network, e.g., when the user of the mobile unit would like to initiate a voice or data call. Alternatively, the network may initiate the wireless communication link with the mobile unit. For example, in conventional hierarchical wireless communications, a server transmits voice and/or data destined for a target mobile unit to a central element such as such as a Radio Network Controller (RNC). The RNC may then transmit paging messages to the target mobile unit via one or more base stations or node-Bs. The target mobile unit may establish a wireless link to one or more of the base stations in response to receiving the page from the wireless communication system. A radio resource management function within the RNC receives the voice and/or data and coordinates the radio and time resources used by the set of base stations to transmit the information to the target mobile unit. The radio resource management function can perform fine grain control to allocate and release resources for broadcast transmission over a set of base stations.

A conventional base station provides wireless connectivity within a geographical region that is referred to as a cell or a macrocell or a sector. Conventional base stations can transmit signals using a predetermined amount of available transmission power, which in some cases is approximately 35 W for a base station. The range of the macrocell is determined by numerous factors including the available transmission power, angular distribution of the available power, obstructions within the macrocell, environmental conditions, and the like. For example, the range of a macrocell can vary from as little as 300 m in a densely populated urban environment to as much as 10 km in a sparsely populated rural environment. The coverage area can also vary in time if any of these parameters changes.

One alternative to the conventional hierarchical network architecture is a distributed architecture including a network of access points, such as base station routers, that implement distributed communication network functionality. For example, each base station router may combine RNC and/or PDSN functions in a single entity that manages radio links between one or more mobile units and an outside network, such as the Internet. Base station routers wholly encapsulate the cellular access technology and may proxy functionality that utilizes core network element support to equivalent IP functions. For example, IP anchoring in a UMTS base station router may be offered through a Mobile IP Home Agent (HA) and the GGSN anchoring functions that the base station router proxies by through equivalent Mobile IP signaling. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the separate RNC and PDSN entities in hierarchical networks may be reduced or removed.

At least in part because of the reduced cost and complexity of deploying a base station router, base station routers may be deployed in locations that are impractical for conventional base stations. For example, a base station router may be deployed in a residence or building to provide wireless connectivity to the occupants of the residents of the building. Base station routers deployed in a residence are typically referred to as home base station routers or femtocells because they are intended to provide wireless connectivity to a much smaller area (e.g., a femtocell) that encompasses a residence. Femtocells have a much smaller power output than conventional base stations that are used to provide coverage to macrocells. For example, a typical femtocell has a transmission power on the order of 10 mW. Consequently, the range of a typical femtocell is much smaller than the range of a macrocell. For example, a typical range of a femtocell is about 100 m.

Femtocells are expected to be deployed in conjunction with a macro-cellular network in an overlay configuration. For example, a macro-cellular network may be used to provide wireless connectivity to a neighborhood that includes numerous residences. Any mobile unit traveling through the neighborhood or located in one of the residences can access the wireless communication system using the macro-cellular network. Individual femtocells can also be deployed in one or more of the residences to provide overlay coverage within (or near) the residence. Consequently, there will be a one-to-many relationship between the macrocells and the femtocells within the coverage area. However, user equipment will typically only be authorized to camp on the femtocell installed by the user in their residence.

User equipment or mobile units therefore need to identify the correct femtocell before handing off from the macro-cellular network. For example, when a user returns home their mobile unit may be able to detect a macrocell and numerous femtocells associated with different residences.

However, only one femtocell (the femtocell installed by the user in their residence) permits the mobile unit to camp on the femtocell and make circuit-switched calls or initiate packet-switched sessions. The conventional practice is to determine the correct femtocell by trial and error. For example, user equipment may attempt to camp on each available femtocell until it detects the femtocell that allows it to camp. Since the user equipment may not have any information that can guide the selection of candidate femtocells, this brute force technique can consume significant overhead and degrade the user's quality of experience. For example, circuit-switched calls may be dropped in order to use trial and error to find the correct femtocell. As there is no one to one mapping between the scrambling code of the femtocell and the femtocell identifier, in the conventional approach the RNC does not know where the user equipment is located and therefore would attempt many macrocell to femtocell handovers to attempt to find the correct femtocell. This creates a huge signaling overhead on the radio and infrastructure that increases the interference level and reduces the network capacity.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for implementation in user equipment that is configured to communicate with a wireless communication system that includes at least one macro-cell and a plurality of femtocells. The method includes providing a call connection request from the user equipment to one of the plurality of femtocells and receiving information indicating a location of the femtocell and information indicating the femto cell is a premier femtocell associated with the user equipment. The call connection setup information is received at the user equipment from the premier femtocell in response to providing the call connection request. The method further includes storing the information indicating the location of the premier femtocell in the user equipment.

In another embodiment, a method is provided for implementation in a femtocell that is configured for deployment in a wireless communication system that includes at least one macro-cell. The method includes receiving, at the femtocell, a call connection request from user equipment and providing information indicating a location of the femtocell and information indicating that the femtocell is a premier femtocell associated with the user equipment. The information is provided from the femtocell to the user equipment in response to the call connection request. The information indicating the location of the premier femtocell can be stored in the user equipment.

In yet another embodiment, a method is provided for implementation in a radio network controller configured for deployment in a wireless communication system that includes at least one macro-cell and a plurality of femtocells. The method includes receiving, at the radio network controller, a call connection request from user equipment configured to be associated with a premier femtocell that is one of the plurality of femtocells. The method also includes providing, from the radio network controller to the user equipment in response to the call connection request, a call connection set up message. The method further includes receiving information indicating availability of the premier femtocell associated with the user equipment and at least one frequency used for transmission between said user equipment and the premier femtocell. The information is received at the radio network controller and from the user equipment in response to the call connection set up message. The radio network controller stores the information indicating the availability of the premier femtocell and the frequency(ies). For example, in some cases the radio network controller stores the physical coordinates (e.g., the GPS location), the identity of the user equipment (e.g., an International Mobile Subscriber Identity), a scrambling code, and the frequency of the femtocell associated with the user equipment.

BRIEF DESCRIPTION OF THE DRAWINGS

The disclosed subject matter may be understood by reference to the following description taken in conjunction with the accompanying drawings, in which like reference numerals identify like elements, and in which:

FIG. 4 conceptually illustrates one exemplary embodiment of a method of establishing communication between user equipment and a macro-cell when the user equipment is not associated with a premier femtocell; and FIG. 5 conceptually illustrates one exemplary embodiment of a method of establishing communication between user equipment and a macro-cell when the user equipment is associated with a premier femtocell While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Figure 1:
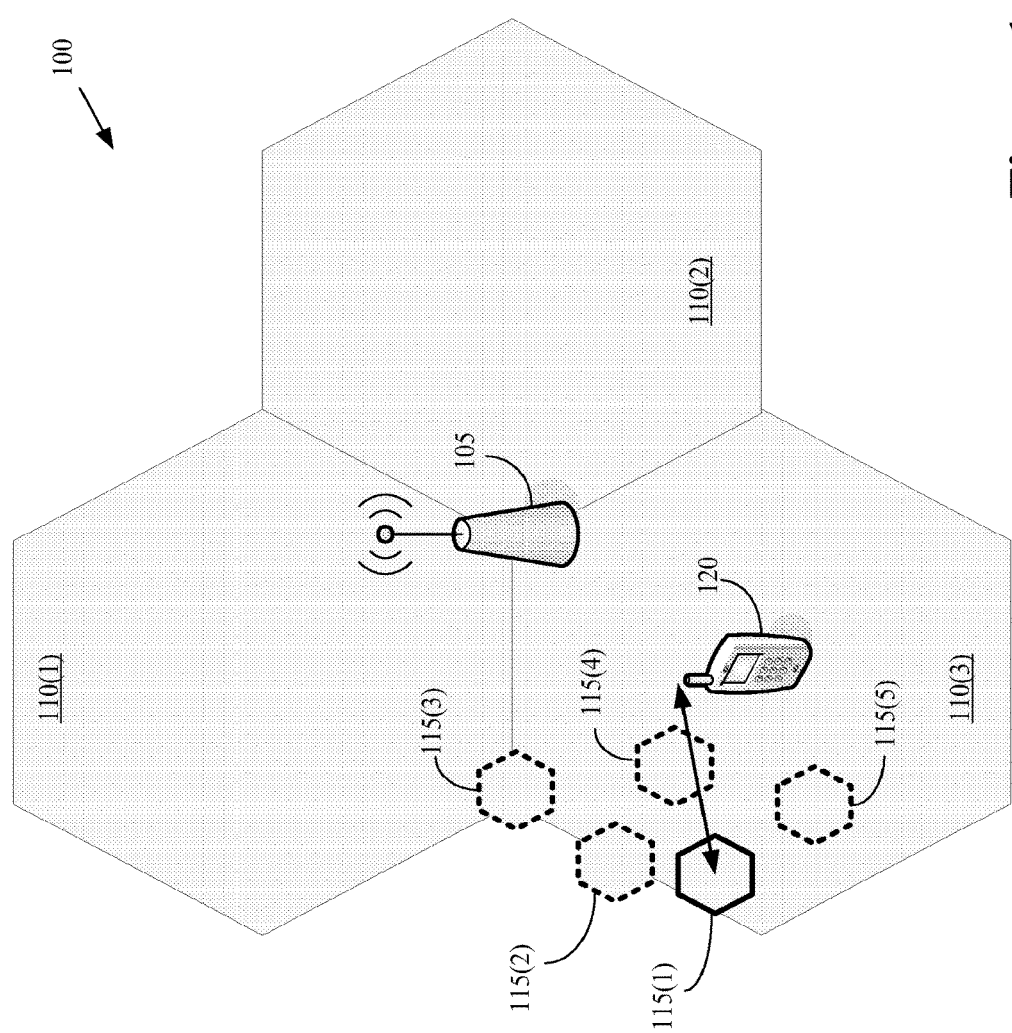
FIG. 1 conceptually illustrates a first exemplary embodiment of a wireless communication system.

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a wireless communication system 100. In the illustrated embodiment, a base station 105 provides wireless connectivity to a plurality of macro-cells 110(1-3). Although the indices (1-3) can be used to identify individual macro cells 110(1) or subsets thereof, these indices may be dropped when referring collectively to the macro-cells 110. This convention may be applied to other elements depicted in the drawings and referred to using an identifying numeral and one or more distinguishing indices. The macro-cells 110 shown in FIG. 1 correspond to different sectors associated with the base station 105. For example, the base station 105 may include three antennas (or three groups of antennas) that provide wireless connectivity to three sectors associated with the three macro-cells 110. However, persons of ordinary skill in the art having benefit of the present disclosure should appreciate that alternative embodiments may use a different base station 105 to provide wireless connectivity to each macro-cell 110. Moreover, the wireless communication system 100 may include any number of macro-cells 110 and/or base stations 105.

The wireless communication system 100 also includes an overlay network of femtocells 115. For example, the femtocells 115 may be installed in businesses and/or residences by individual users. In the interest of clarity, only five femtocells 115 are depicted in FIG. 1. However, persons of ordinary skill in the art having benefit of the present disclosure should appreciate that the wireless communication system 100 may include any number of femtocells 115 distributed throughout the wireless communication system 100. User equipment, such as the mobile unit 120 shown in FIG. 1, can be associated with one or more of the femtocells 115. For example, a user that has installed the femtocell 115(1) in a residence can configure the user equipment 120 so that the user equipment 120 recognizes the femtocell 115(1) as its premier femtocell. The user equipment 120 may therefore preferentially handoff to the premier femtocell 115(1) when the user equipment 120 approaches the premier femtocell 115(1).

In the illustrated embodiment, the user equipment 120 is configured to identify the femtocell 115(1) as its premier femtocell in response to a call connection request transmitted from the user equipment 120 to the femtocell 115(1). For example, the user equipment 120 and/or the femtocell 115(1) may be in a configuration mode, e.g., as a result of user input and/or as a result of the femtocell 115(1) and/or the user equipment 120 determining that the user equipment 120 is not currently registered with the femtocell 115(1). When the femtocell 115(1) receives the call connection request, the femtocell 115(1) may send the user equipment 120 a message including information indicating its location and indicating that it is the premier femtocell for the user equipment 120. The user equipment 120 may then store the information indicating the location of the premier femtocell 115(1) so that this information can be used during future communications.

Figure 2:
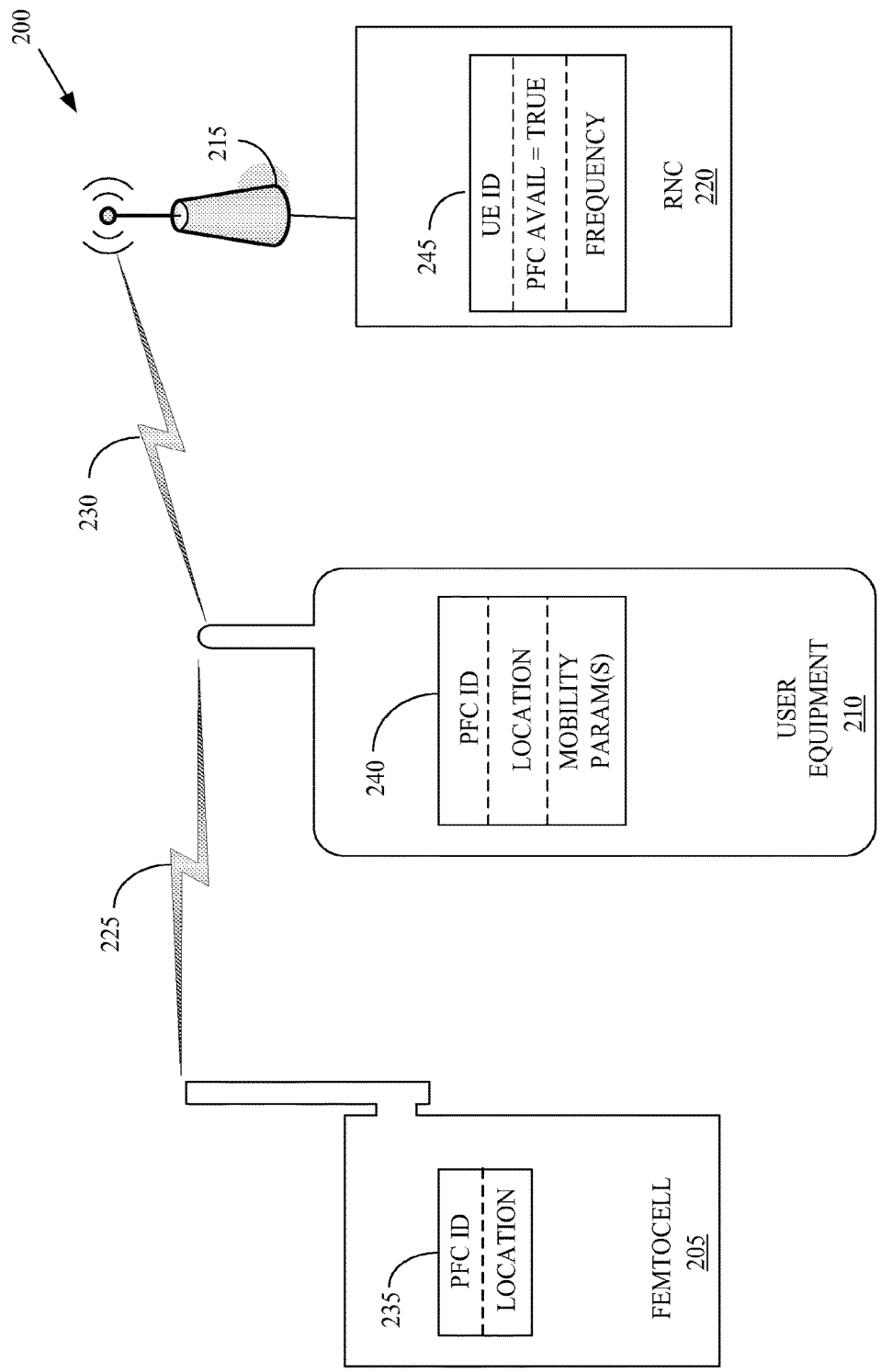
FIG. 2 conceptually illustrates a second exemplary embodiment of a wireless communication system.

FIG. 2 conceptually illustrates a second exemplary embodiment of a wireless communication system 200. In the illustrated embodiment, the wireless communication system 200 includes a femtocell 205, user equipment 210, a base station 215, and a radio network controller (RNC) 220. Persons of ordinary skill in the art having benefit of the present disclosure should appreciate that the wireless communication system 200 may include other elements that are not depicted in FIG. 2 to avoid unnecessarily obscuring the discussion. The femtocell 205 and the user equipment 210 can communicate over an air interface 225. The user equipment 210 and the base station 215 can communicate over another air interface 230. Persons of ordinary skill in the art having benefit of the present disclosure should appreciate that the air interfaces 225, 230 can be used concurrently and/or simultaneously but are not necessarily used concurrently and/or simultaneously. For example, the femtocell 205 and the user equipment 210 may communicate over the air interface 225 during a first time interval and then tear down the air interface 225. The user equipment 210 may then communicate with the base station 215 over the air interface 230 during a second time interval after tearing down the air interface 225.

The femtocell 205 is a premier femtocell for the user equipment 210. In the illustrated embodiment, the femtocell 205 stores information 235 including an identifier and information indicating the location of the femtocell 205. The location information may be determined using numerous different techniques, including Global Positioning System (GPS) functionality incorporated into the femtocell 205 or manual configuration of the femtocell 205 by a user or a service provider. Accordingly, the user equipment 210 may be configured so that it recognizes the femtocell 205 as a premier femtocell associated with it, and the radio network controller 220 may be configured so that it recognizes the user equipments 210 is associated with a premier femtocell.

In response to receiving a call connection request from the user equipment 210 over the air interface 225, the femtocell 205 may transmit the information 235 (as well as any other information including location or mobility related information) to the user equipment 210. In one embodiment, an optional parameter (Boolean), PremierFemtoCellAvailable, may be added to the RRC Connection Setup message. During RRC Connection establishment between the femtocell 205 and the user equipment 210, the femtocell 205 sets this parameter to TRUE. A conditional parameter PremierFemtoCellLocation may also be added to the RRC Connection Setup message. The condition of the presence of this parameter is that the flag PremierFemtoCellAvailable is TRUE.

The user equipment 210 may then store the identity of the premier femtocell 205, the location of the premier femtocell 205, and any other mobility parameters associated with the premier femtocell 205. Exemplary mobility parameters include, but are not limited to, primary scrambling codes (PSC), an international mobile subscriber identity, a UTRAN Radio Network Temporary Identifier (U-RNTI), and the like. In the illustrated embodiment, the user equipment 210 defines a local variable, e.g. a data structure 240, to store the femtocell information relevant to mobility. In the illustrated embodiment, the user equipment 210 stores the current cell information (relevant to mobility) and the location information from the RRC Connection Setup message into the PremierFemtoCell local data structure 240 when the PremierFemtoCellAvailable Boolean is set to True. The user equipment 210 may not take any action (e.g., the user equipment 210 may not store any information or create a data structure) when the Boolean is set to FALSE or the parameter does not exist.

The user equipment 210 may also communicate the information provided by the premier femtocell 205 to the radio network controller 220 via the macro-cell base station 215. In the illustrated embodiment, the user equipment 210 communicates information to the radio network controller 220 during RRC connection establishment. For example, optional parameters such as a Boolean variable PremierFemtoCellAvailable and a frequency of the femtocell 205 can be added to the RRC Connection Setup Complete message. If the local value of PremierFemtoCellAvailable is set to TRUE, then the user equipments 210 informs the radio network controller 220 that a premier femtocell is available by adding this information in the RRC Connection Setup Complete message. The user equipment 210 may also use the RRC Connection Setup Complete message to indicate the frequency (or frequencies) used by the premier femtocell.

The radio network controller 220 maintains a context database 245 to include contact information associated with the user equipment 210, as well as other user equipment served by macro-cells that are connected to the radio network controller 220. In the illustrated embodiment, the radio network controller 220 stores the information associated with the user equipment 210 and information indicating that the user equipment 210 is associated with a premier femtocell in the RRC context 245 for the user equipment 210. For example, the context 245 for the user equipment 210 may include an identifier, a Boolean variable indicating that a premier femtocell is available, a parameter indicating the frequency used by the premier femtocell, and the location of the femtocell. Once the context 245 for the user equipment 215 has been configured, the radio network controller 220 knows that the user equipment 210 is associated with a premier femtocell. Although the user equipment 210 has been depicted as being associated with a single premier femtocell, persons of ordinary skill in the art having benefit of the present disclosure should appreciate that in alternative embodiments the user equipment 210 may be associated with more than one premier femtocell.

Figure 3:
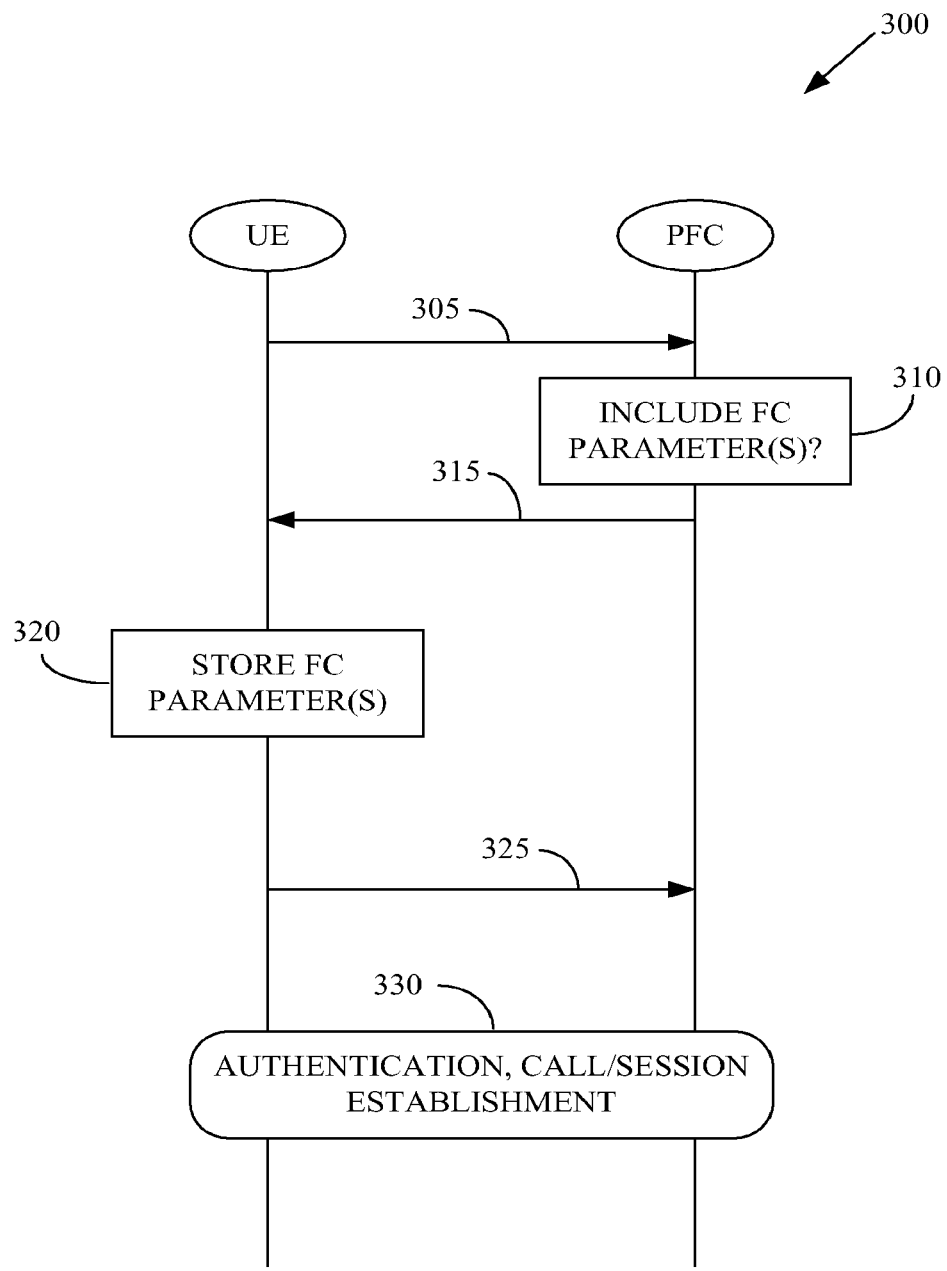
FIG. 3 conceptually illustrates one exemplary embodiment of a method of associating user equipment with a premier femtocell.

FIG. 3 conceptually illustrates one exemplary embodiment of a method 300 of associating user equipment (UE) with a premier femtocell (PFC). In the illustrated embodiment, the user equipment initiates the association/configuration process by transmitting (at 305) a message to the premier femtocell. For example, the message may be a RRC connection request message that is transmitted (at 305) over an air interface. The femtocell then determines (at 310) whether the user equipment has a premier femtocell. For example, the femtocell may check the release version of user equipment and, if the release is known to support premier femtocell functionality, the femtocell may determine that the user equipment supports premier femtocell functionality. The femtocell may then transmit (at 315) a message including configuration information for the premier femtocell. In the illustrated embodiment, the femtocell transmits (at 315) an RRC connection setup message that includes the Boolean variable PremierFemtoCellAvailable with a value of TRUE and information indicating the location of the premier femtocell, such as a variable PremierFemtoCellLocation.

The user equipment can store (at 320) the premier femtocell parameters transmitted by the premier femtocell. For example, the user equipment can store (at 320) the premier femtocell parameters in a database that is constructed for this purpose. Completion of the connection setup process can then be indicated by transmitting (at 325) a message such as a RRC Connection Set Up Complete message. At this point, a RRC connection has been established (at 330) and the user equipment and femtocell can proceed with any other steps that may be used to establish communication over the air interface. The steps may include, but are not limited to, authentication of the user equipment and/or the femtocell, call establishment, session establishment, and the like.

FIG. 4 conceptually illustrates one exemplary embodiment of a method 400 of establishing communication between user equipment and a macro-cell when the user equipment is not associated with a premier femtocell. This embodiment may be implemented in the user equipment has a release version that does not support femtocell or premier femtocell communication. In this case, the Boolean variable PremierFemtoCellAvailable is not defined or transmitted. Alternatively, the user equipment may have a release version that does support femtocell or premier femtocell communication but may not have been associated with a premier femtocell. In this case, the Boolean variable PremierFemtoCellAvailable is defined and set equal to FALSE. The user equipment may transmit (at 405) a connection request to the macro-cell and/or the radio network controller (MC/RNC). The macro-cell responds (at 410) with a connection set up message. The user equipment may then perform conventional set up procedures and transmit (at 415) a connection setup complete message. At this point, an RRC connection has been established (at 420). Since the user equipment is not associated with a premier femtocell, the messages 405, 410, 415 do not include any variables or parameters associated with a premier femtocell.

FIG. 5 conceptually illustrates one exemplary embodiment of a method 500 of establishing communication between user equipment and a macro-cell when the user equipment is associated with a premier femtocell. In this case, the Boolean variable PremierFemtoCellAvailable is defined and set to TRUE. The method 500 begins when the user equipment transmits (at 505) a connection request to the macrocell and the macrocell replies by transmitting (at 510) a connection setup request. Since the user equipment is associated with a femtocell, the user equipment generates (at 515) availability and/or frequency variables such as PremierFemtoCellAvailable and PremierFemtoCellFrequency. The user equipment may then transmit (at 520) a connection setup complete message that includes the Boolean variable PremierFemtoCellAvailable with a value of TRUE. The connection setup complete message may also include information indicating the frequency (or frequencies) used by the premier femtocell. Upon reception of the connection setup complete message, the radio network controller stores (at 525) the femtocell information and/or mobility information, e.g. in a context associated with the user equipment. The RRC connection is now established (at 530).

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. User equipment configured to:
provide a call connection request over a first air interface;
receive, over the first air interface in response to providing the call connection request, information indicating a location of one of a plurality of femtocells and information indicating that said one of the plurality of femtocells is a premier femtocell associated with said user equipment, wherein said user equipment is authorized to camp on the premier femtocell,
receive a connection set up message including a Boolean value that is set to TRUE to indicate that said one of the plurality of femtocells is the premier femtocell; and
store mobility-related cell information comprising a location of the premier femtocell and at least one of a unique cell identifier, an international mobile subscriber identity, or a Universal Terrestrial Radio Access Network (UTRAN) Radio Network Temporary Identifier (U-RNTI).

2. The user equipment of claim 1, wherein said user equipment is configured to transmit said information indicative of the premier femtocell over a second air interface associated with at least one macrocell.

3. The user equipment of claim 2, wherein said user equipment is configured to transmit, over the second air interface, information indicating that the premier femtocell is available and information indicating a frequency used by the premier femtocell.

4. The user equipment of claim 2, wherein said user equipment is configured to transmit, over the second air interface, said information indicative of the premier femtocell in a connection set up complete message.

5. The user equipment of claim 1, wherein the unique cell identifier is a scrambling code.

6. User equipment configured to:
provide a call connection request over a first air interface;
receive, over the first air interface in response to providing the call connection request, information indicating a location of one of a plurality of femtocells and information including a Boolean value to indicate that said one of the plurality of femtocells is a premier femtocell associated with said user equipment, wherein the Boolean value is set to TRUE to indicate that said one of the plurality of femtocells is the premier femtocell, and wherein said user equipment is authorized to camp on the premier femtocell; and
store mobility-related cell information comprising at least one of a unique cell identifier, an international mobile subscriber identity, a location of the femtocell, or a Universal Terrestrial Radio Access Network (UTRAN) Radio Network Temporary Identifier (U-RNTI) indicating the location of the premier femtocell.

7. The user equipment of claim 6, wherein said user equipment is configured to transmit said information indicative of the premier femtocell over a second air interface associated with at least one macrocell.

8. The user equipment of claim 7, wherein said user equipment is configured to transmit, over the second air interface, information indicating that the premier femtocell is available and information indicating a frequency used by the premier femtocell.

9. The user equipment of claim 7, wherein said user equipment is configured to transmit, over the second air interface, said information indicative of the premier femtocell in a connection set up complete message.

10. The user equipment of claim 6, wherein the unique cell identifier is a scrambling code.

* * * * *